United States Patent Office.

EDMUND TWEEDY, OF DANBURY, CONNECTICUT, AND HENRY L. BREVOORT AND ISAIAH L. ROBERTS, OF BROOKLYN, NEW YORK.

PROCESS OF TREATING FUR TO PREPARE IT FOR FELTING.

SPECIFICATION forming part of Letters Patent No. 339,354, dated April 6, 1886.

Application filed December 22, 1885. Serial No. 186,482. (No specimens.)

*To all whom it may concern:*

Be it known that we, EDMUND TWEEDY, a resident of the town of Danbury, in the county of Fairfield and State of Connecticut, and HENRY L. BREVOORT and ISAIAH L. ROBERTS, residents of the city of Brooklyn, county of Kings, and State of New York, and all citizens of the United States, have invented a new and useful Improvement in Processes for Treating Fur to Prepare it for Felting, of which the following is a specification.

We have already applied for patents describing the treatment of fur with prepared oxidizing-fumes in order to put the fur in such condition that it may subsequently be felted, and we have described methods of carrying out in practice our inventions.

We have since discovered that the action of the prepared oxidizing vapors or fumes is much increased if, after they are prepared, they are mingled with aqueous vapor, either above or below the boiling-point of water.

In carrying out our present invention we manufacture nitric or nitrous fumes preferably, though other oxidizing-fumes can be used, and we introduce with them into the chamber or receptacle containing the fur a jet of steam, or we produce aqueous vapor in the chamber itself by heating preferably boiling water in a vessel therein, and we commingle the aqueous vapor and the prepared oxidizing-fumes either before or at the time the fumes come in contact with the fur. By so doing we find that the action of the fumes upon the fur is hastened or increased in power, and the period of treatment may be thus reduced. We do not confine ourselves to any precise proportion of vapor and fumes, as a beneficial effect is attained even with a small percentage of aqueous vapor. Of course the proportion of aqueous vapor could be increased so much that it would dilute the oxidizing-fumes so as to prevent or impair their proper action, and this must be avoided. One part, by bulk, of oxidizing-fumes to, say, from one-fourth ($\frac{1}{4}$) to one-half ($\frac{1}{2}$) their bulk of aqueous vapor constitutes a good mixture.

Our theory is that the artificial supply of moisture enables the oxidizing-fumes to perform their oxidizing function more rapidly or energetically, and in practice it certainly hastens the treatment.

Whether our theory is correct or not, the beneficial results above described will be attained by following the directions given in the specification.

What we claim, and desire to secure by Letters Patent, is—

As an improvement in the art of treating fur with oxidizing-vapors to adapt it for felting, the process which consists in preparing oxidizing fumes or vapors from proper material or materials, and in mixing the said vapors with the vapor of water, and submitting the fur to the action of the commingled vapors, substantially as described.

EDMUND TWEEDY.
HENRY L. BREVOORT.
ISAIAH L. ROBERTS.

Witnesses:
B. T. VETTERLEIN,
A. J. LEHMAN.